United States Patent [19]

Dresselhouse

[11] Patent Number: 5,154,530
[45] Date of Patent: Oct. 13, 1992

[54] BALL JOINT

[75] Inventor: Kurt F. Dresselhouse, Oxford, Mich.

[73] Assignee: TRW Inc., Lyndhurst, Ohio

[21] Appl. No.: 664,771

[22] Filed: Mar. 5, 1991

[51] Int. Cl.$^5$ .................................................. F16C 11/00
[52] U.S. Cl. ........................................ 403/138; 403/140; 403/141
[58] Field of Search ................. 403/77, 141, 138, 140

[56] References Cited

U.S. PATENT DOCUMENTS

| 3,846,032 | 11/1974 | Harada et al. ................. 403/140 |
| 4,017,197 | 4/1977 | Farrant . |
| 4,059,361 | 11/1977 | Allison . |
| 4,360,284 | 11/1982 | Brandenburg . |
| 4,790,682 | 12/1988 | Henkel ........................... 403/140 |
| 4,890,949 | 1/1990 | Wood, Jr. . |

FOREIGN PATENT DOCUMENTS 2376964  4/1978  France ........................... 403/138
829998   3/1960  United Kingdom .

Primary Examiner—Andrew V. Kundrat
Attorney, Agent, or Firm—Tarolli, Sundheim & Covell

[57] ABSTRACT

A ball joint comprises a socket having a chamber with a main portion and a recessed portion extending radially outward from the main portion. The socket has an opening into the chamber, and a seam bordering the recessed portion of the chamber. First and second bearing members having surfaces in sliding contact with the ball end a stud support the ball end of the stud for pivotal movement in the main portion of the chamber. The first bearing member has a flange extending in the recessed portion of the chamber. An annular sealing member extends in the recessed portion of the chamber between the flange and the socket. The annular sealing member is formed as flange on the second bearing member.

12 Claims, 6 Drawing Sheets

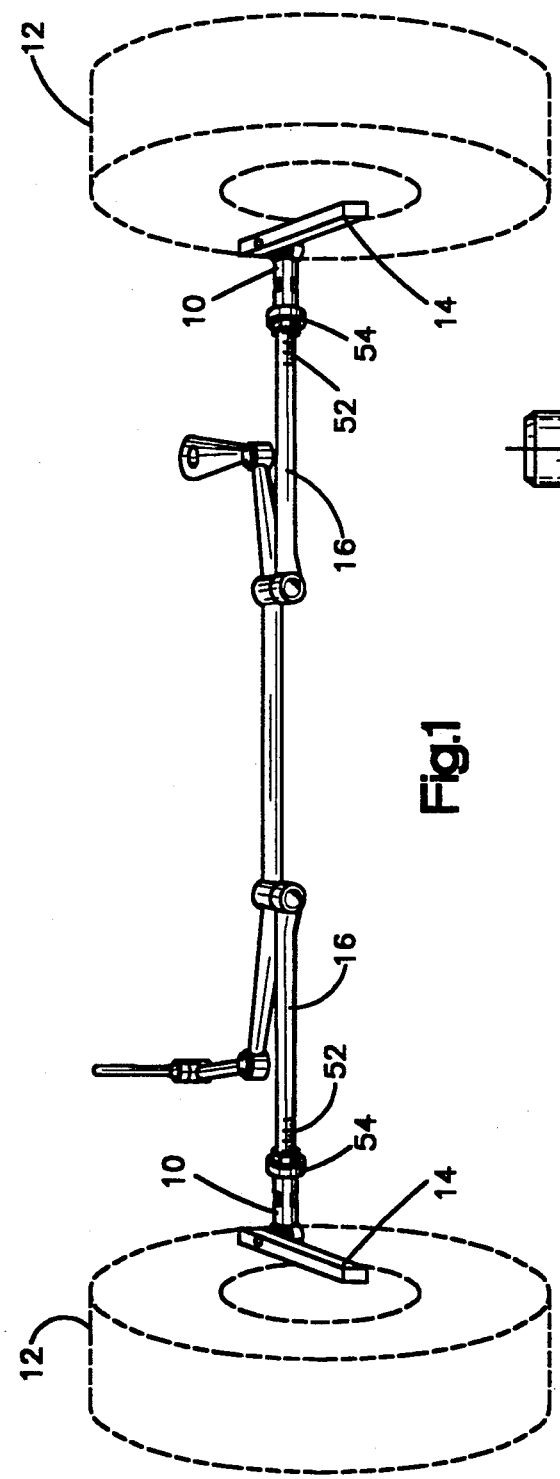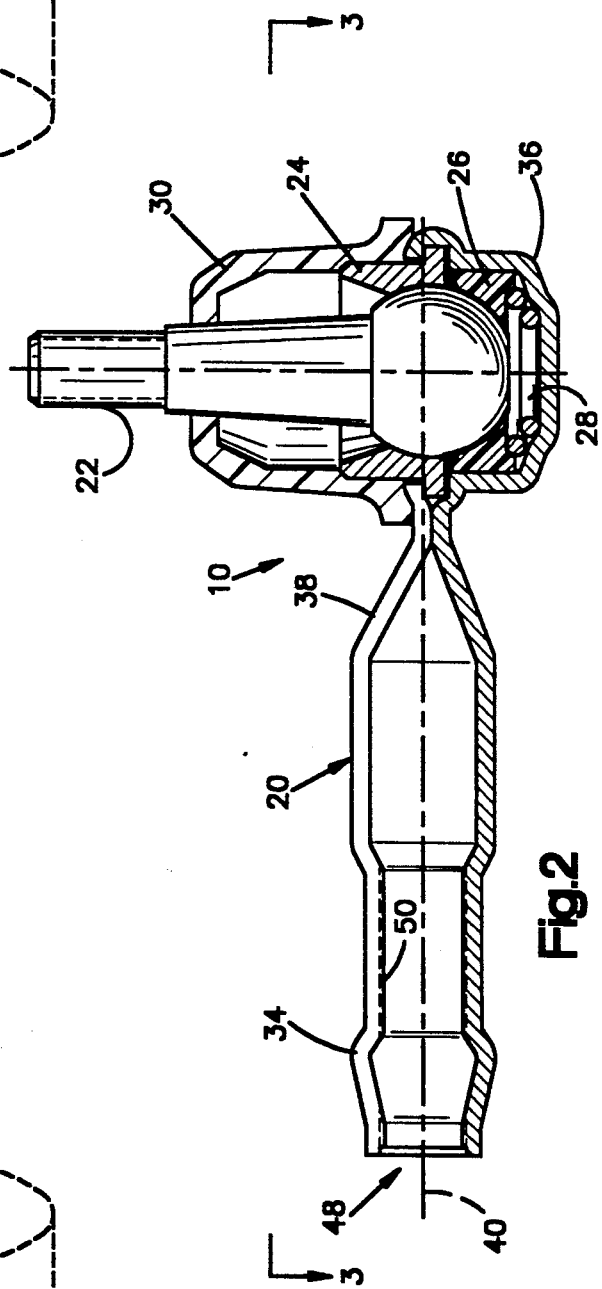

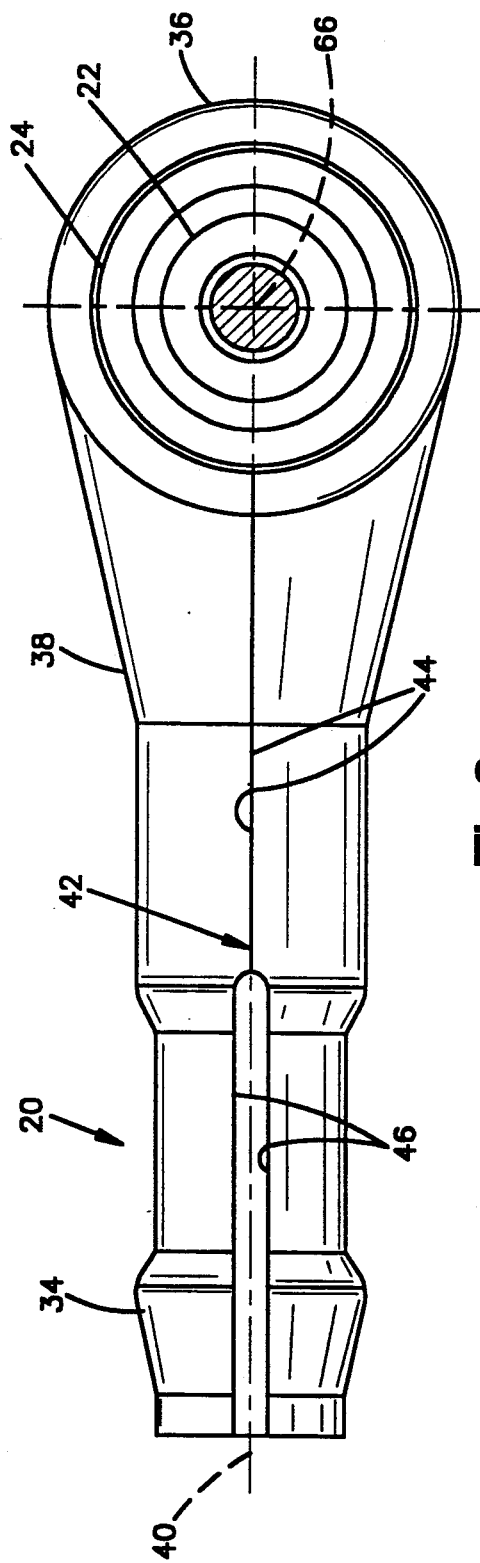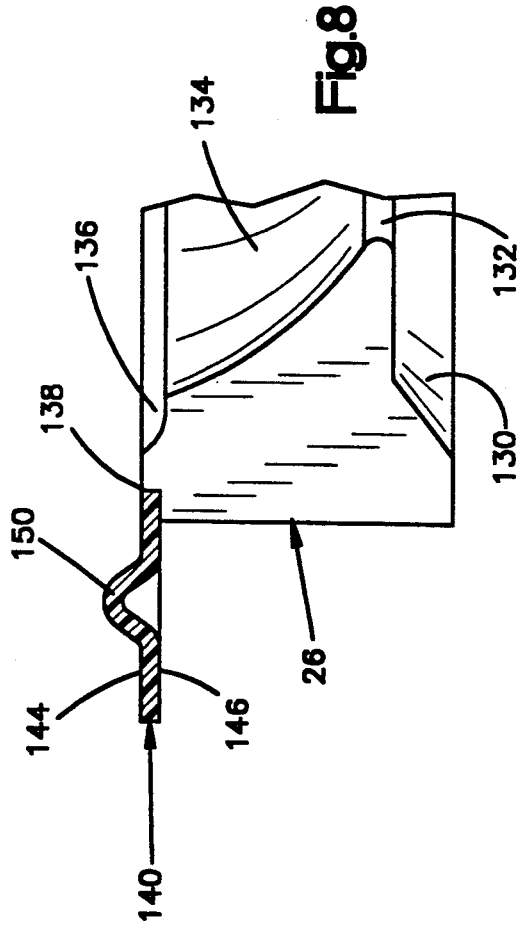

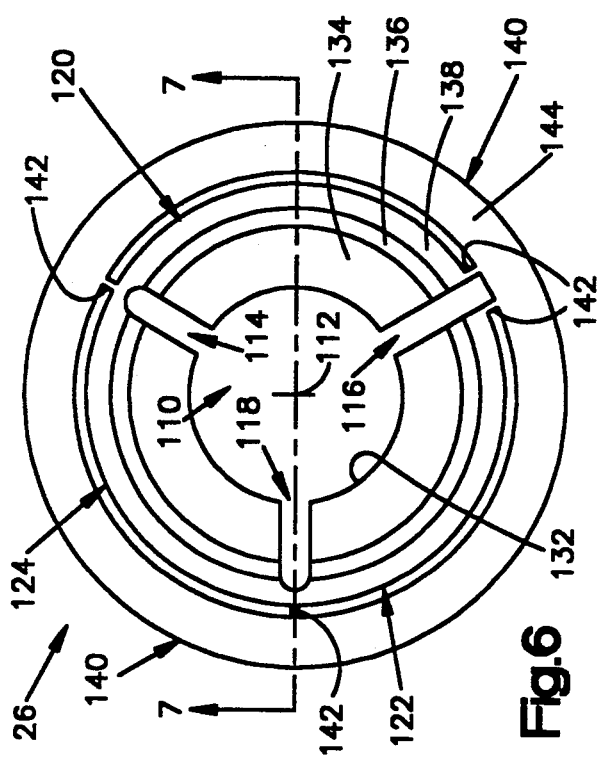
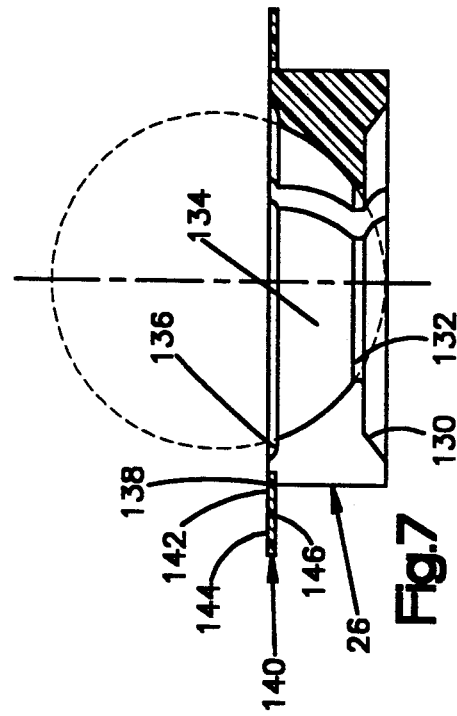
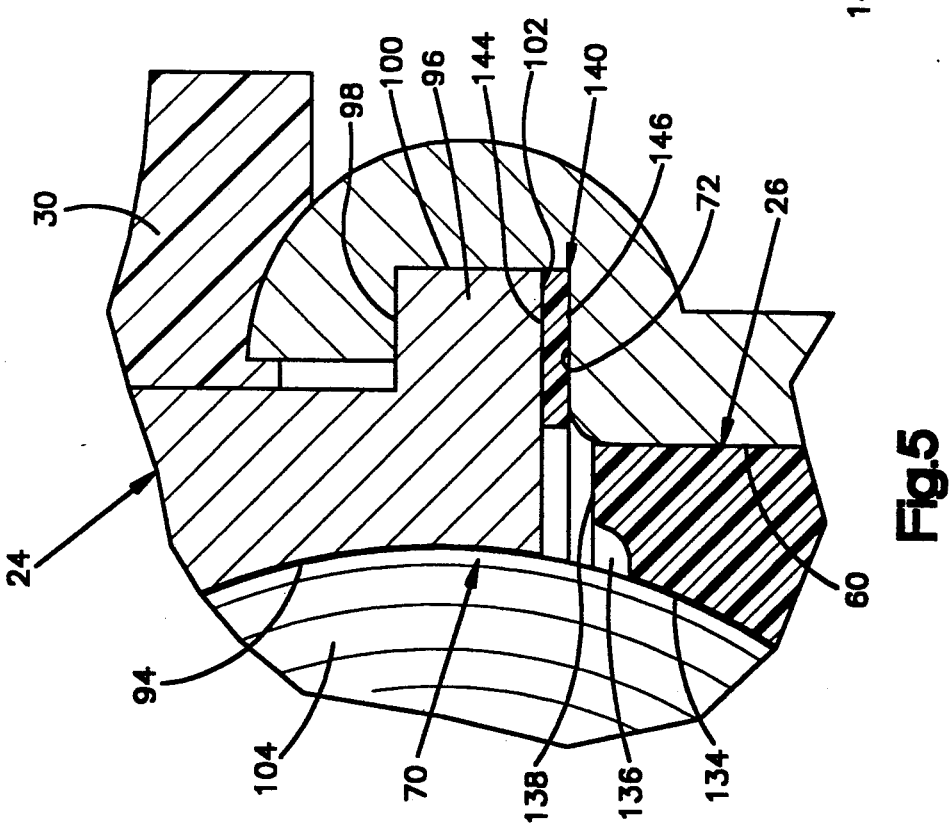

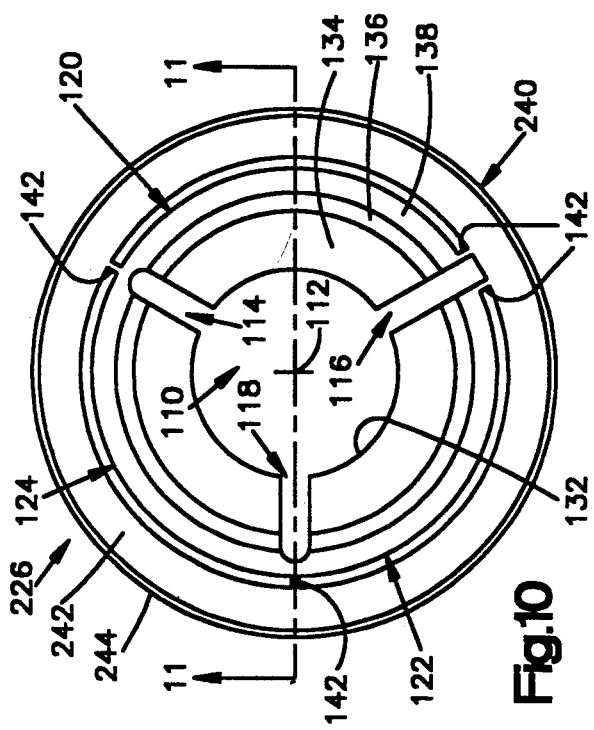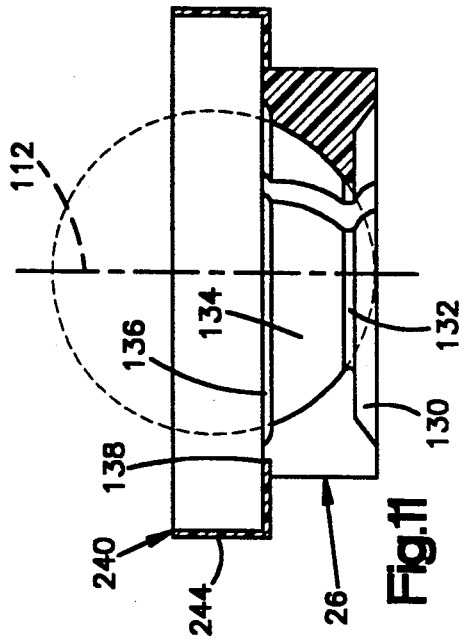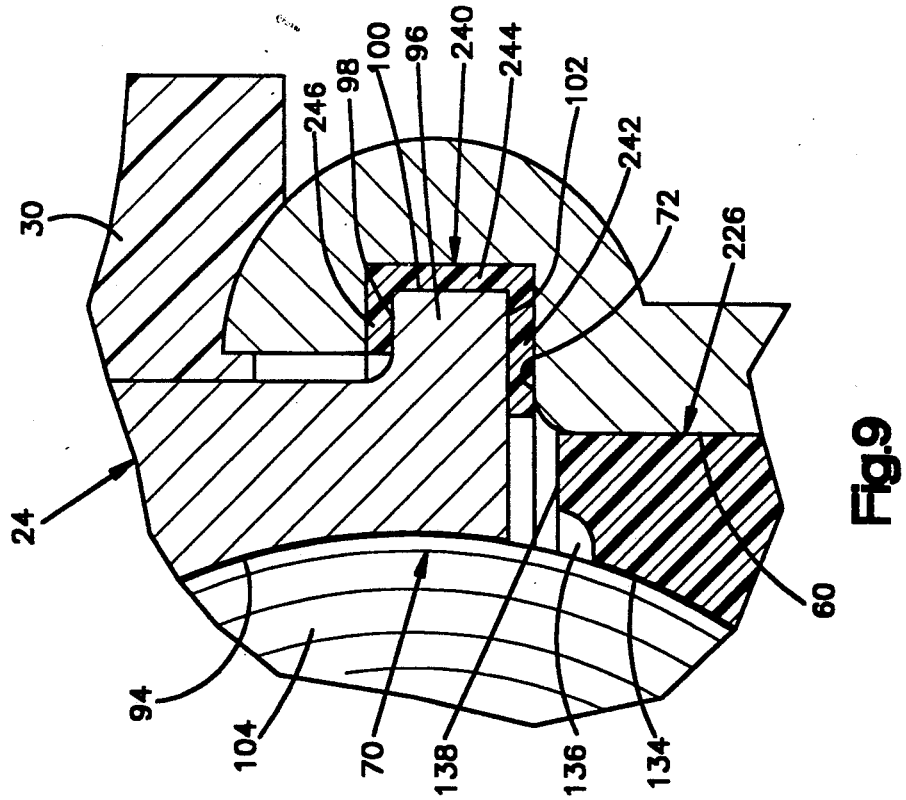

5,154,530

BALL JOINT

FIELD OF THE INVENTION

The present invention relates to a ball joint for a vehicle suspension or steering linkage.

BACKGROUND OF THE INVENTION

A ball joint is shown in co-pending U.S. patent application Ser. No. 524,129, filed May 14, 1990, assigned to the assignee of the present application. The ball joint shown in the co-pending application comprises a stud having a shank and a ball end. The ball end of the stud is supported for limited pivotal movement in a socket. The socket comprises a single sheet metal part defining a chamber for the ball end of the stud. Adjoining portions of the sheet metal part define a recessed portion of the chamber, and have adjoining edges which define a seam bordering the recessed portion of the chamber. Two bearings are located within the chamber and have opposed bearing surfaces against which the surface of the ball end slides. One of the bearings has a flange extending into the recessed portion of the chamber and traversing the seam. The flange seals the chamber against the entry of contaminants through the seam, and reinforces the sheet metal structure of the socket.

SUMMARY OF THE INVENTION

In accordance with the present invention, a ball joint comprises a socket with an inner surface defining a chamber. The chamber has a main portion with an axis, and a recessed portion extending radially outward from the main portion. The socket has an opening into the chamber and a seam bordering the recessed portion of the chamber.

A first bearing supports the ball end of a stud for pivotal movement in the main portion of the chamber. The first bearing has a surface in sliding contact with the ball end, and has a flange extending in the recessed portion of the chamber. A second bearing also supports the ball end of the stud for pivotal movement in the chamber, and has a surface in sliding contact with the ball end. A lubricant is provided between the sliding surfaces of the ball end and the bearings.

An annular sealing member extends circumferentially and radially in the recessed portion of the chamber between the socket and the flange on the first bearing. The annular sealing member and the flange on the first bearing block the lubricant from leaking out through the seam, and block contaminants from reaching the sliding surfaces of the ball end and the bearings through the seam. The annular sealing member is formed as a flange on the second bearing.

The flange on the first bearing is rigid and serves to reinforce the sheet metal structure of the socket as well as to seal the seam. The annular sealing member is flexible as compared with the flange on the first bearing, and flexes to fill voids between the flange on the first bearing and the socket when clamped therebetween. The annular sealing member can also experience plastic deformation so as to flow into such voids. The annular sealing member and the flange on the first bearing thus cooperate to structurally reinforce and seal the socket.

In one embodiment of the present invention, the second bearing comprises an annular body portion and a plurality of shear tabs extending radially from the body portion to the annular sealing member. During assembly, the socket is formed around the first and second bearings to clamp the flange on the first bearing and the annular sealing member together in the recessed portion of the chamber. The shear tabs are broken when the socket is formed around the first and second bearings. The second bearing is then free to move in the chamber relative to the first bearing under the influence of a spring which urges the second bearing against the ball end of the stud.

In another embodiment of the present invention, the second bearing comprises a flexible web extending radially from the body portion of the second bearing to the annular sealing member. The web permits the body portion of the second bearing to move relative to the annular sealing member and the first bearing under the influence of the spring to take up wear in the bearings, but resists misalignment of the bearings in the socket chamber.

BRIEF DESCRIPTION OF THE DRAWINGS

The foregoing and other features of the present invention will become apparent to those skilled in the art upon reading the following description of preferred embodiments of the invention in view of the accompanying drawings, wherein:

FIG. 1 is a schematic view of a portion of a vehicle steering system including a ball joint in accordance with the present invention;

FIG. 2 is a sectional view of a ball joint shown in FIG. 1;

FIG. 3 is a view taken on line 3—3 of FIG. 2 with a part removed for clarity of illustration;

FIG. 5 is an enlarged partial view of the ball joint of FIG. 4;

FIG. 6 is a plan view of a part of the ball joint of FIG. 2 prior to assembly;

FIG. 7 is a view taken on line 7—7 of FIG. 6;

FIG. 8 is a view, partly in section, of a part of a ball joint in accordance with another embodiment of the present invention;

FIG. 9 is an enlarged partial sectional view of a ball joint in accordance with still another embodiment of the present invention;

FIG. 10 is a plan view of a part of the ball joint of FIG. 9 prior to assembly;

FIG. 11 is a sectional view taken on line 11—11 of FIG. 10;

DESCRIPTION OF PREFERRED EMBODIMENTS

Figure 4:
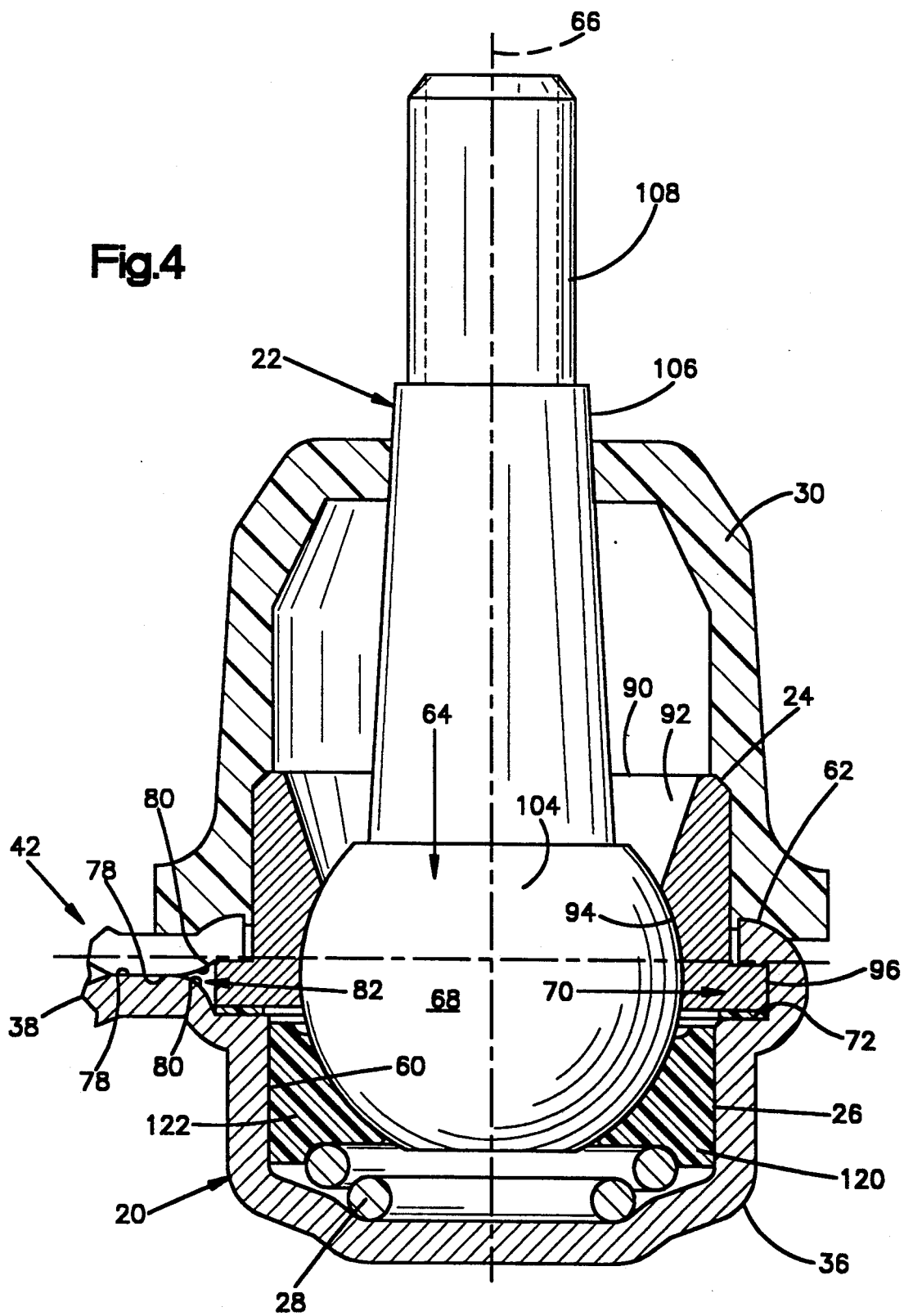
FIG. 4 is an enlarged partial sectional view of the ball joint of FIG. 2.

In FIG. 1 there is shown a schematic view of a portion of a vehicle steering system including a ball joint 10 constructed in accordance with a preferred embodiment of the present invention. The vehicle steering system comprises a pair of steerable wheels 12 with steering arms 14, a pair of tie rods 16, and a pair of ball joints 10 connecting the steering arms 14 with the tie rods 16. The ball joints 10 are identical. The ball joint 10 shown at the right hand side of FIG. 1 is shown in greater detail in FIG. 2.

As shown in FIG. 2, the ball joint 10 comprises a socket 20 and a ball stud 22. The ball joint 10 further comprises upper and lower bearings 24 and 26 which support the ball stud 22 for pivotal movement in the socket 20. A spring 28 biases the lower bearing 26 toward the upper bearing 24. A lubricant, preferably grease, is contained in the socket 20 to lubricate the ball stud 22 for sliding movement against the bearings 24 and 26. A boot seal 30 is received over the socket 20 and the ball stud 22 in a known manner.

The socket 20 is formed from a single metal part. Preferably, the socket 20 is stamped from sheet metal using a progressive die, and is formed of SAE XLF 950 steel supplied by Worthington Steel Co. The socket 20 could alternately be formed of any SAE/ASTM grade of stamping material suitable to meet the strength, ductility and formability requirements of the process and final product application.

The socket 20 has a first end portion 34, a second end portion 36, and a transitional portion 38 on a horizontal axis 40. As shown in FIG. 3, a first seam 42 extends longitudinally along the top side of the socket 10 from the first end portion 34 to the second end portion 36. The first seam 42 is defined in part by abutting edges 44 of the socket 20, and in part by adjacent edges 46 which are slightly spaced apart.

The first end portion 34 of the socket 20 has an opening 48 centered on the horizontal axis 40 and has internal threads 50 extending from the opening 48. When the ball joint 10 is assembled in the vehicle steering system shown schematically in FIG. 1, the end portion of the associated tie rod 16 is received in the opening 48 in the first end portion 34 of the socket 20. External threads 52 on the tie rod 16 are engaged with the internal threads 50 in the socket 20, and a nut 54 threaded on the tie rod 16 holds the tie rod 16 in the socket 20. The space between the edges 46 of the socket 20 at the first seam 42 permits the first end portion 34 to be clamped onto the end of the tie rod 16 by the nut 54.

Referring now to FIG. 4, the second end portion 36 of the socket 20 has an inner surface 60 and an outer surface 62. The inner surface 60 defines a cylindrical chamber 64 which is centered on a vertical axis 66. The chamber 64 has a main portion 68 in which the ball stud 22 is located, and a recessed portion 70 which extends radially from the main portion 68 and circumferentially about the main portion 68. A horizontal shoulder surface portion 72 of the inner surface 60 extends circumferentially about the vertical axis 66 in the recessed portion 70 of the chamber 64. The horizontal shoulder surface portion 72 of the inner surface 60, being formed of sheet metal, could have irregularities in localized areas which deviate slightly from the uniform flat contour shown in FIG. 5. The outer surface 62 of the socket 20 defines a circular opening into the chamber 64 which is also centered on the vertical axis 66.

The transitional portion 38 of the socket 20 include abutting surfaces 78 which extend circumferentially about the vertical axis 66. The inner surface 60 at the second end portion 36 of the socket 20 includes portions 80 which converge toward the abutting surfaces 78. A second seam 82 is defined at the line where the converging surface portions 80 meet the abutting surfaces 78. The second seam 82 thus borders the recessed portion 70 of the chamber 64, and extends circumferentially about the vertical axis 66. If voids are present between the abutting surfaces 44 and/or the abutting surfaces 78, contaminants could enter the chamber 62 through the first and second seams 42 and 82, and grease in the chamber 62 could leak out through the first and second seams 42 and 82.

The upper bearing 24 is rigid, and is preferably formed of SAE 1010 steel. As shown in FIG. 4, the upper bearing 24 has an annular body portion 90 with a frusto-conical inner surface 92 and a spherical inner surface 94. A reinforcing flange 96 having a rectangular cross-sectional shape extends around the lower end of the body portion 90. As shown in enlarged detail in FIG. 5, the reinforcing flange 96 has a horizontal upper surface 98, a cylindrical outer surface 100, and a horizontal lower surface 102.

The ball stud 22 is preferably formed of SAE 8115 modified or SAE 8615 steel which is cold formed or machined, carburized or carbonitrided to a 20–30 Rc core hardness and a 0.006–0.015 inch case depth, and supplied by Republic Steel Corp. As shown in FIG. 4, the ball stud 22 comprises a ball end 104 and a shank 106 extending from the ball end 104. The shank 106 has threads 108 for connecting the ball stud 22 to the associated steering arm 14, as shown in FIG. 1.

The lower bearing 26 is formed of a plastic material, preferably nylon type 6/6 manufactured by E. I. DuPont De Nemours & Co, and thus is rigid as compared with elastomeric bearings known in the prior art. The lower bearing 26 is shown in FIGS. 6 and 7 in its original manufactured condition prior to being assembled into the ball joint 10. The lower bearing 26 has an annular shape with a central opening 110 and a central axis 112. Three slots 114, 116 and 118 extend radially from the central opening 110 to divide the lower bearing 26 into three arcuate segments 120, 122 and 124. Each of the three segments 120, 122 and 124 has a lower surface 130, an inner edge surface 132, and a spherical surface 134. A common spherical contour of the three spherical surfaces 134 is indicated by the dashed circular line in FIG. 7. Each of the three segments 120, 122 and 124 also has a grease channel surface 136 and a horizontal upper surface 138. The three segments 120, 122 and 124 together define a rigid annular body portion of the lower bearing 26.

The lower bearing 26 further comprises an annular sealing flange 140, and a plurality of shear tabs 142 extending radially from the three segments 120, 122 and 124 to the sealing flange 140. The sealing flange 140 has an upper surface 144 and a lower surface 146. Being relatively thin and formed of a plastic material, the sealing flange 140 at the lower bearing 26 is flexible as compared with the rigid steel reinforcing flange 96 at the upper bearing 24.

As shown in FIG. 6, the second slot 116 in the lower bearing 26 differs from the first and third slots 114 and 118 in that the second slot 116 extends entirely from the central opening 110 to the sealing flange 140. The first and second segments 120 and 122 of the lower bearing 26 are thus not connected across their respective horizontal upper surfaces 138 as are the first and third segments 120 and 124, but instead are connected by a pair of shear tabs 142 and an adjacent portion of the sealing flange 140. The upper surface 144 of the sealing flange 140 is level with the horizontal upper surfaces 138 of the three segments 120, 122 and 124 when the lower bearing 26 is in its original manufactured condition as shown in FIGS. 6 and 7.

During assembly of the ball joint 10, the spring 28, the upper and lower bearings 24 and 26, and the ball stud 22 are inserted into the socket 20 before the socket 20 is formed into its final shape as shown in FIGS. 2, 4 and 5. The lower bearing 26 is inserted into the chamber 64 atop the spring 28, with the lower surface 146 of the sealing flange 140 overlying the horizontal shoulder surface portion 72 of the inner socket surface 60. The upper bearing 24 and the ball stud 22 are received in the chamber 64 with the surface of the ball end 104 in slidable contact with the spherical surfaces of both bearings 24 and 26, and with the horizontal lower surface 102 of the reinforcing flange 96 overlying the upper surface 144 of the sealing flange 140. The socket 20 is then deformed into its final shape such that the reinforcing flange 96 and the sealing flange 140 are firmly clamped together in the recessed portion 70 of the chamber 64.

When the socket 20 is deformed to clamp the reinforcing flange 96 and the sealing flange 140 in the recessed portion 70 of the chamber 64, the upper bearing 24 and the ball stud 22 are forced downward onto the lower bearing 26 against the bias of the spring 28. The three segments 120, 122 and 124 of the lower bearing 26 are then moved downward from the sealing flange 140, and the shear tabs 142 are broken. The sealing flange 140 is thus assembled into the ball joint 10 as an annular sealing member which is detached from the lower bearing 26. The first and second segments 120 and 122 are then no longer connected to each other by the shear tabs 142, and are free to move relative to each other under the influence of the spring 28 to take up wear in the bearings 24 and 26. All three segments 120, 122 and 124 of the lower bearing 26 are free to move relative to the sealing flange 140 under the influence of the spring 28 to take up wear. The three segments 120, 122 and 124 are thus assembled into the ball joint 10 as bearing members separate from the sealing flange 140. The grease channel surfaces 136 and the slots 114, 116, and 118 define passages for the grease to flow around and over the entire surface of the ball end 104 of the ball stud 22.

The reinforcing flange 96 and the sealing flange 140 are clamped together in the recessed portion 70 of the chamber. The reinforcing flange 96 provides rigid structural support for the socket 20. Both the reinforcing flange 96 and the sealing flange 140 block contaminants and grease from passing between the main portion 68 of the chamber 64 and the exterior of the socket 20 through the first and second seams 42 and 82. The sealing flange 140 cooperates with the reinforcing flange 96 by flexing under the clamping force exerted by the socket 20 to conform to irregularities, if any, in the contour of the horizontal shoulder surface portion 72 of the inner socket surface 60. The sealing flange 140 also experiences plastic deformation so as to flow into and fill voids between the horizontal shoulder surface portion 72 and the horizontal lower surface 102 of the reinforcing flange 96.

In the embodiment shown in FIG. 8, the sealing flange 140 has a rib 150. The rib 150 protrudes axially and extends circumferentially about the sealing flange 140. When the sealing flange 140 is clamped between the horizontal lower surface 102 of the reinforcing flange 96 and the horizontal shoulder surface portion 72 of the inner socket surface 60, the rib 150 is flattened under the clamping forces applied to it. The clamping forces will then cause plastic deformation of the rib 150 which causes the plastic material of the sealing flange 140 to flow into voids in the adjacent metal surfaces. The rib 150 thus tightens the seal against contaminants and grease.

In the embodiment of the invention shown in FIGS. 9-11, a lower bearing 226 has a sealing flange 240 which differs from the sealing flange 140 described above. The lower bearing 226 is otherwise the same as the lower bearing 26 described above, and its other elements have the same reference numerals in the Figures.

The sealing flange 240 has a first horizontal section 242 which, like the sealing flange 140 described above, is clamped between the lower horizontal surface 102 of the reinforcing flange 96 and the horizontal shoulder surface portion 72 of the inner socket surface 60. The sealing flange 240 also has a vertical section 244 and a second horizontal section 246. The vertical section 244 is clamped between the cylindrical outer surface 100 of the reinforcing flange 96 and the inner socket surface 60. The second horizontal section 246 is clamped between the upper horizontal surface 98 of the reinforcing flange 96 and the inner socket surface 60. The sealing flange 240 thus wraps around the reinforcing flange 96 to provide a more extensive seal than the sealing flange 140 described above.

As shown in FIGS. 10 and 11, the sealing flange 240 has an original manufactured shape comprising only the first horizontal section 242 and the vertical section 244. When the socket 10 is deformed to clamp the sealing flange 240 in the recessed portion 70 of the chamber 54, the plastic material of the sealing flange 240 is plastically deformed from the shape shown in FIGS. 10 and 11 to the shape shown in FIG. 9. The upper horizontal section 246 is thus formed from a portion of the originally manufactured vertical section 244.

Figure 13:
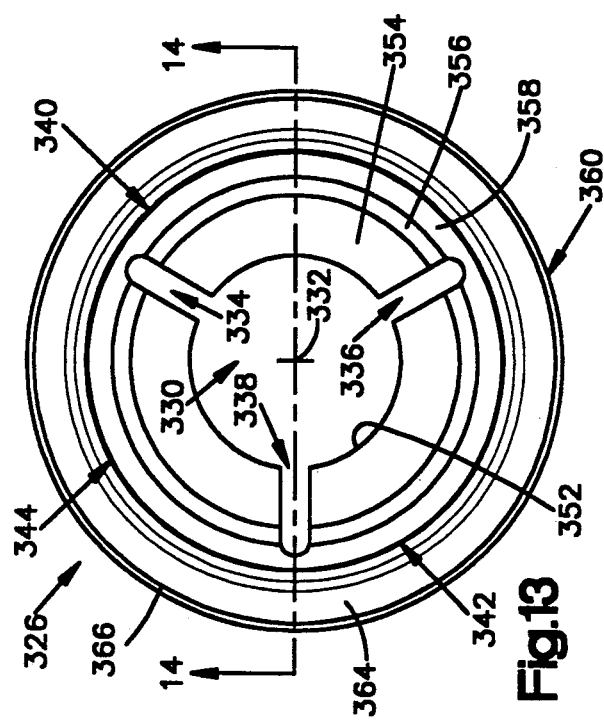
FIG. 13 is a plan view of a part of the ball joint of FIG. 12 prior to assembly.
Figure 14:
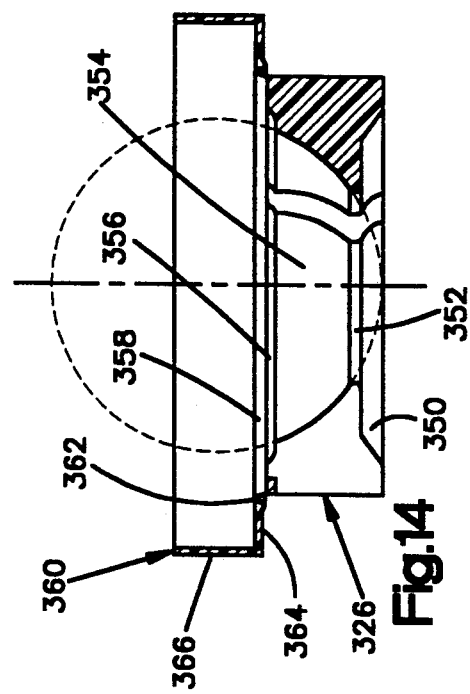
FIG. 14 is a sectional view taken on line 14—14 of FIG. 13.
Figure 12:
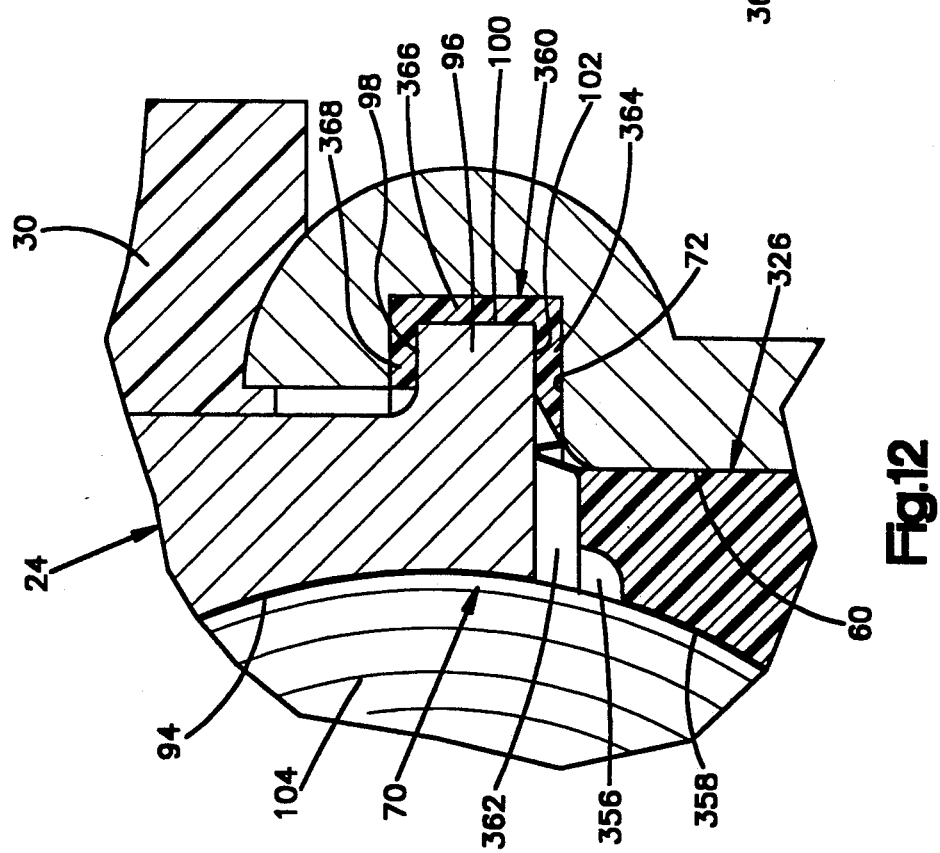
FIG. 12 is an enlarged partial view of a ball joint in accordance with yet another embodiment of the present invention.

Yet another embodiment of the invention is shown in FIGS. 12-14. In this embodiment, the ball joint 10 includes a lower bearing 326 which is likewise formed of a plastic material, but which differs from the lower bearings 26 and 226 described above The lower bearing 326 is shown in FIGS. 13 and 14 in its original manufactured condition prior to being assembled into the ball joint 10. The lower bearing 326 has an annular shape with a central opening 330 and a central axis 332. Three slots 334, 336 and 338 extend radially from the central opening 330 to divide the lower bearing 326 into three arcuate segments 340, 342 and 344. Each of the three segments 340, 342 and 344 has a lower surface 350, an inner edge surface 352, and a spherical surface 354. A common spherical contour of the three spherical surfaces 354 is indicated by the dashed circular line in FIG. 13. Each of the three segments 340, 342 and 344 also has a grease channel surface 356 and a horizontal upper surface 358.

The lower bearing 326 further comprises an annular sealing flange 360, and a circular web 362 extending radially from the three segments 340, 342 and 344 to the sealing flange 360. The web 362 has a convoluted cross-sectional shape, as shown in FIG. 14, and resists movement of the three segments 340, 342, and 344 relative to the sealing flange 360. The web 362 locates the segments 340, 342 and 344 in positions centered on the vertical axis 66 when the lower bearing 326 is inserted into the socket 10, and holds them from becoming misaligned with the upper bearing 24. The three segments 340, 342, and 344 of the lower bearing 326 are thus assembled into the ball joint 10 as bearing members which remain joined with the sealing flange 360 by the web 362. The spring 28 overcomes the resistance of the web 362 to move the segments 340, 342, and 344 vertically to take up wear.

The sealing flange 360 is similar to the sealing flange 240 described above. In its original manufactured shape as shown in FIGS. 13 and 14, the sealing flange 360 has a horizontal section 364 and a vertical section 366 extending axially from the outer end of the horizontal section 364. When the socket 10 is deformed to clamp the sealing flange 360 in the recessed portion 70 of the socket chamber 64 as shown in FIG. 12, a second horizontal section 368 of the sealing flange 360 is formed from a portion of the vertical section 366. The sealing flange 360 is thus wrapped around the reinforcing flange 96 to fully seal the recessed portion 70 of the socket chamber 64. As with the sealing flanges 140 and 240 described above, the sealing flange 360 is relatively flexible as compared with the rigid steel reinforcing flange 96, and flexes and/or experiences plastic deformation to fill voids between the reinforcing flange 96 and the inner socket surface 60 when forcefully clamped between those surfaces.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a socket with an inner surface defining a chamber having a main portion with an axis and a recessed portion extending radially outward from said main portion, said socket having an opening into said chamber and a seam bordering said recessed portion of said chamber;
   a stud having a ball end for location in said main portion of said chamber and a shank for extending outward from said opening;
   a first bearing member for supporting said ball end for pivotal movement in said main portion of said chamber, said first bearing member having a first bearing surface for slidably engaging said ball end, and having a flange for extending in said recessed portion of said chamber;
   a second bearing member for location in said chamber and for supporting said ball end for pivotal movement in said main portion of said chamber, said second bearing member having a second bearing surface for slidably engaging said ball end;
   an annular sealing member for extending circumferentially and radially in said recessed portion of said chamber between said flange and said inner surface of said socket, said annular sealing member being formed as a flange on said second bearing member; and
   said second bearing member being formed with means for detachment of said annular sealing member from said second bearing member.

2. Apparatus as defined in claim 1 wherein said means for detachment comprises breakable tabs.

3. Apparatus comprising:
   a socket with an inner surface defining a chamber having a main portion with an axis and a recessed portion extending radially outward from said main portion, said socket having an opening into said chamber and a seam bordering said recessed portion of said chamber;
   a stud having a ball end for location in said main portion of said chamber and a shank for extending outward from said opening;
   a first bearing member for supporting said ball end for pivotal movement in said main portion of said chamber, said first bearing member having a first bearing surface for slidably engaging said ball end, and having a flange for extending in said recessed portion of said chamber;
   a second bearing member for location in said chamber and for supporting said ball end for pivotal movement in said main portion of said chamber, said second bearing member having a second bearing surface for slidably engaging said ball end;
   an annular sealing member for extending circumferentially and radially in said recessed portion of said chamber between said flange and said inner surface of said socket, said annular sealing member being formed as a flange on said second bearing member;
   said second bearing member comprising a body portion having said second bearing surface, said body portion being movable along said axis relative to said annular sealing member; and
   said second bearing member further comprising a flexible web extending radially from said body portion to said second flange.

4. Apparatus as defined in claim 3 wherein said web has a convoluted cross-sectional shape.

5. A ball joint comprising:
   a socket having a chamber with an axis, an opening into said chamber, a seam bordering said chamber, and a socket shoulder surface in said chamber, said socket shoulder surface extending circumferentially and radially relative to said axis;
   a stud having a ball end in said chamber and a shank extending outward from said opening;
   a first bearing member having a spherical bearing surface in sliding contact with said ball end, and a first bearing surface extending over said socket shoulder surface;
   a second bearing member having a spherical bearing surface in sliding contact with said ball end;
   a lubricant in said chamber;
   an annular sealing member extending circumferentially and radially between said socket shoulder surface and said first bearing surface, whereby said annular sealing member blocks said lubricant from flowing between said socket shoulder surface and said first bearing surface;
   said socket being formed around said annular sealing member to clamp said annular sealing member between said socket shoulder surface and said first bearing surface; and
   said annular sealing member having an axially protruding rib prior to being clamped between said socket shoulder surface and said first bearing surface, said rib being flattened between said surfaces upon being clamped therebetween.

6. A ball joint comprising:
   a socket having a chamber with an axis, an opening into said chamber, a seam bordering said chamber, and a socket shoulder surface in said chamber, said socket shoulder surface extending circumferentially and radially relative to said axis;
   a stud having a ball end in said chamber and a shank extending outward from said opening;
   a first bearing member having a spherical bearing surface in sliding contact with said ball end, and a first bearing surface extending over said socket shoulder surface;

a second bearing member having a spherical bearing surface in sliding contact with said ball end;

a lubricant in said chamber;

an annular sealing member extending circumferentially and radially between said socket shoulder surface and said first bearing surface, whereby said annular sealing member blocks said lubricant from flowing between said socket shoulder surface and said first bearing surface;

said socket being formed around said annular sealing member to clamp said annular sealing member between said socket shoulder surface and said first bearing surface; and said annular sealing member having a first section extending radially outward relative to said axis, and a second section extending axially from said first section.

7. A ball joint as defined in claim 6 wherein said annular sealing member has a third section extending radially inward from said second section.

8. A bearing for a ball joint, said bearing comprising:

a rigid annular body portion having a central axis and a spherical surface for slidably engaging the ball end of a ball stud;

a circular flange extending circumferentially about said body portion and radially outward relative to said body portion; and means for enabling said body portion to move axially relative to said flange, said enabling means detachably joining said flange with said body portion.

9. A bearing for a ball joint, said bearing comprising:

a rigid annular body portion having a central axis and a spherical surface for slidably engaging the ball end of a ball stud;

a circular flange extending circumferentially about said body portion and radially outward relative to said body portion; and means for enabling said body portion to move axially relative to said flange, said enabling means comprising a flexible circular web extending radially from said body portion to said flange.

10. A ball joint comprising:

a socket having a chamber with an axis, an opening into said chamber, a seam bordering said chamber, and a socket shoulder surface in said chamber, said socket shoulder surface extending circumferentially and radially relative to said axis;

a stud having a ball end in said chamber and a shank extending outward from said opening;

a first bearing member having a spherical bearing surface in sliding contact with said ball end, and a first bearing surface extending over said socket shoulder surface;

a second bearing member having a body with a spherical bearing surface in sliding contact with said ball end, said second bearing member being movable along said axis relative to said first bearing member;

a lubricant in said chamber;

means for blocking said lubricant from flowing between said socket shoulder surface and said first bearing surface, said blocking means comprising an annular sealing member extending circumferentially and radially between said socket shoulder surface and said first bearing surface; and said second bearing member having a preassembled condition before being installed in said socket, said second bearing member including means for connecting said annular sealing member to said body of said second bearing member when said second bearing member is in said preassembled condition.

11. A ball joint as defined in claim 10 wherein said socket is formed around said annular sealing member and clamps said annular sealing member between said socket shoulder surface and said first bearing surface.

12. A bearing for a ball joint, said bearing comprising:

a rigid annular body having a central axis and a spherical surface for slidably engaging the ball end of a ball stud;

a circular flange extending circumferentially about said body and radially outward relative to said body; and connecting means for connecting said flange to said body, said connecting means being located radially between said flange and said body and enabling said flange to move axially relative to said body.

* * * * *